United States Patent [19]
Beeck et al.

[11] Patent Number: 5,765,366
[45] Date of Patent: Jun. 16, 1998

[54] FUEL FEED FOR GAS TURBINES HAVING AN ANNULAR COMBUSTION CHAMBER

[75] Inventors: Alexander Beeck, Endingen, Switzerland; Klaus Guthier, Weinheim, Germany; Marcel König, Freienwil, Switzerland; Peter Senior, Countesthorpe, Great Britain

[73] Assignee: Asea Brown Boveri AG, Baden, Switzerland

[21] Appl. No.: 673,512

[22] Filed: Jul. 1, 1996

[30] Foreign Application Priority Data

Jul. 3, 1995 [DE] Germany .......... 195 24 213.0

[51] Int. Cl.⁶ .................................................. F02C 1/00
[52] U.S. Cl. ................ 60/39.36; 60/742; 60/739; 239/431
[58] Field of Search .............. 60/739, 742, 39.32; 239/427.5, 428, 431

[56] References Cited

U.S. PATENT DOCUMENTS

| | | | |
|---|---|---|---|
| 5,036,657 | 8/1991 | Seto et al. | 60/739 |
| 5,231,833 | 8/1993 | MacLean et al. | 60/739 |
| 5,243,815 | 9/1993 | Maier et al. | 60/39.32 |
| 5,257,502 | 11/1993 | Napoli | 60/739 |
| 5,295,352 | 3/1994 | Beebe et al. | 60/39.06 |
| 5,359,847 | 11/1994 | Pillsbury et al. | 60/39.06 |
| 5,365,738 | 11/1994 | Etheridge | 60/742 |

FOREIGN PATENT DOCUMENTS

| | | |
|---|---|---|
| 0321809B1 | 6/1989 | European Pat. Off. |
| 4306956A1 | 9/1994 | Germany. |
| 4307086A1 | 9/1994 | Germany. |
| 4335412A1 | 4/1995 | Germany. |
| 2122333 | 1/1984 | United Kingdom. |

*Primary Examiner*—Timothy Thorpe
*Assistant Examiner*—Cheryl J. Tyler
*Attorney, Agent, or Firm*—Burns, Doane, Swecker & Mathis, L.L.P.

[57] ABSTRACT

The object of the invention is to create a simple and compact fuel feed for a gas turbine having an annular combustion chamber. In addition, the operational reliability of the gas turbine is to be improved.

According to the invention, this is achieved when only one central main-gas feed line (15) and one central pilot-gas feed line (16) are connected to the annular combustion chamber (1). A main-gas ring line (13) and a pilot-gas ring line (14) are formed in the interior of the gas-turbine casing (5) or a burner hood (3) known per se. These ring lines (13, 14) are connected upstream to the main-gas feed line (15) and the pilot-gas feed line (16) respectively and downstream to the annular combustion chamber (1). (FIG. 1)

8 Claims, 4 Drawing Sheets

FUEL FEED FOR GAS TURBINES HAVING AN ANNULAR COMBUSTION CHAMBER

BACKGROUND OF THE INVENTION

1. Field of the Invention

The invention relates to a fuel feed for gas turbines having an annular combustion chamber, the burners of which are operated with either gaseous or liquid fuel.

2. Discussion of Background

All fuels required for operating gas turbines must be fed from outside the gas-turbine casing. Depending on the type and number of burners, different fuel feeds are known, in each case a plurality of recesses for the fuel feed lines being formed in the gas-turbine casing.

DE-A1 43 06 956 discloses a fuel feed for a gas turbine having an annular combustion chamber, which is operated by means of a plurality of double-cone burners suitable for both liquid and gaseous fuels. The burners are fed with liquid fuel via in each case a fuel lance fastened in the gas-turbine casing, i.e. each burner has its own fuel feed. In each case a separate connection serves to direct the various fuels into the lance, which connection is screwed at the upstream end of each fuel lance to the corresponding feed lines. That is three connections per fuel lance, which causes hardly any problems in a gas turbine having few burners. However, if a larger number of burners is used, as is normal in the case of annular combustion chambers, a multiplicity of connections and feed lines connected to them result. Therefore a complicated and convoluted fuel feed results, which is very costly to assemble and dismantle. In addition, the reliable sealing of such a large number of screwed connections is problematic.

SUMMARY OF THE INVENTION

Accordingly, one object of the invention, in attempting to avoid all these disadvantages, is to create a simple and compact fuel feed for a gas turbine having an annular combustion chamber. In addition, the operational reliability of the gas turbine is to be improved.

According to the invention, this is achieved in a device in which when only one central main-gas feed line and one central pilot-gas feed line are connected to the annular combustion chamber. A main-gas ring line and a pilot-gas ring line are formed in the interior of the gas-turbine casing or the rear wall of a burner hood known per se. These ring lines are connected upstream to the main-gas feed line and the pilot-gas feed line respectively as well as downstream to the annular combustion chamber.

With the shifting of the main-gas and the pilot-gas ring lines into the interior of the gas-turbine casing or the burner-hood rear wall, this pressure-bearing wall is given a further function, namely that of distributing fuel to the burners. Since now only one main-gas feed line and one pilot-gas feed line are arranged for each of the ring lines, a simple and clearly arranged fuel feed is obtained.

In a first embodiment of the invention, the main-gas and the pilot-gas ring lines are arranged in the interior of the rear wall of the burner hood. Both the main-gas and the pilot-gas feed line are fastened to this rear wall. The main-gas tube of each burner opens out in the rear wall of the burner hood. In the case of burners to be operated alternatively with liquid or gaseous fuel, a fuel lance is arranged which consists merely of the liquid-fuel passage.

Two distribution bores are arranged in the rear wall of the burner hood for each burner, which distribution bores connect the main-gas ring line and the pilot-gas ring line respectively to the main-gas tube and the pilot-gas line respectively. In each case an opening corresponding with one of the distribution bores is formed in both the main-gas tube and the pilot-gas line of the burner.

In this solution, it proves to be especially favorable that both the main gas and the pilot gas are fed centrally and through in each case only one mounting hole in the gas-turbine casing. The hitherto known and, depending on the number of burners, very numerous and relatively large recesses in the gas-turbine casing for accommodating the fuel lances are therefore unnecessary.

For oil operation of the gas turbine, there are in addition to the two recesses for the gaseous fuel further recesses in the gas-turbine casing, but of smaller dimensions, for the fuel lances, i.e. for their liquid-fuel passages. On the other hand, no further recesses are required for pure gas operation. The stability under load of the gas turbine is therefore substantially increased, which permits operation of the gas-turbine plant with higher machine pressures.

It is especially advantageous if insert tubes having expansion joints are arranged between the inner surface of the rear wall of the burner hood and the main-gas ring line and the pilot-gas ring line respectively.

The insert tubes serve to reduce thermal stresses, i.e. to insulate the ring lines from the hot rear wall of the burner hood, which is heated to a considerable extent by the compressor discharge air flowing into the plenum. Consequently, the main gas and pilot gas flowing into the ring lines are not heated to such a great extent, which results in their more uniform distribution to all burners. Changes in diameter in the insert tubes are compensated for via the expansion joints.

It is especially expedient if the central main-gas and the central pilot-gas feed lines are fastened with in each case at least one fastening element in one of the mounting holes in the gas-turbine casing. In each case at least one expansion element is arranged on the fastening elements. This expansion element is preferably a bellows mounting, by means of which the differential pressures prevailing in the two fuel feed lines are compensated. In this way, the service life of the entire fuel feed is prolonged.

In a two-part annular combustion chamber known per se, a central main-gas feed line and a central pilot-gas feed line are arranged in each case, but only one common main-gas ring line and one common pilot-gas ring line are arranged.

Such a design enables the annular combustion chamber to be opened in a simple manner, since only one main-gas feed line and one pilot-gas feed line have to be released.

In a multi-row arrangement of the burners, likewise only one central main-gas feed line and one pilot-gas feed line as well as one main-gas ring line and one pilot-gas ring line are formed. The main-gas ring line and the pilot-gas ring line are arranged between the burner rows and are connected to the main-gas tubes and the pilot-gas lines respectively of the corresponding burners of both burner rows via in each case two distribution bores formed in the rear wall of the burner hood.

The advantage of a simple and clearly arranged fuel feed is thereby realized even in the case of a substantially larger number of burners.

In a next embodiment of the invention, the main-gas and the pilot-gas ring lines are arranged in the interior of the gas-turbine casing. Both the main-gas and the pilot-gas feed lines are fastened to the gas-turbine casing. The main-gas tubes project beyond the gas-turbine casing. The part of the main-gas tubes which projects from the gas-turbine casing in each case merges into a first end piece. In each case a first connection for the main-gas feed line and a second connection for the pilot-gas feed line are arranged on the end pieces. These connections are connected in the interior of the fuel lances to the main-gas tube and the pilot-gas line respectively in a manner known per se. In each case a connecting line is arranged between the main-gas ring line and the first connection as well as between the pilot-gas ring line and the second connection and is screwed to the corresponding connection.

In a further development of this embodiment, a fuel lance is arranged in the main-gas tube, which fuel lance consists of the pilot-gas line and the liquid-fuel passage. A second end piece is fastened in a non-positive manner to the upstream end of the first end piece, into which second end piece the liquid-fuel passage connected to a feed line via a third connection extends in a manner known per se.

In this solution, a compact type of construction is achieved by the omission of ring lines arranged outside the gas-turbine casing and their fastenings.

In a further embodiment of the invention, the main-gas and the pilot-gas ring lines are likewise arranged in the interior of the gas-turbine casing. However, the main-gas tubes and the pilot-gas lines already open out in each case in one of the mounting holes in the gas-turbine casing. Two distribution bores are arranged for each burner in a manner analogous to the first embodiment of the invention, although not in the rear wall of the burner hood but in the gas-turbine casing. Likewise, the two openings corresponding with the distribution bores are formed in the main-gas tube and the pilot-gas line respectively.

The main-gas tubes of the burners end upstream in each case in a flange which is fastened directly on the inside to the gas-turbine casing. The pilot-gas lines are integrally connected upstream in each case to a cap-like end piece. These end pieces close off the recesses in the gas-turbine casing to the outside.

In a further development, the liquid-fuel passage is extended beyond the cap-like end piece and ends in a separate end piece on which the feed line for the liquid fuel acts via a connection.

The number of detachable connections fastened to the fuel lances is substantially reduced by the direct connections between the main-gas ring line and the main-gas tubes and between the pilot-gas ring line and the pilot-gas lines in the interior of the gas-turbine casing. There are only connections for the feed lines of the liquid fuel. The separate connecting lines to the fuel lances are completely dispensed with. Thus only relatively few feed lines are required, i.e. the type of construction becomes more compact and the sealing at the connections becomes simpler.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

Figure 1:
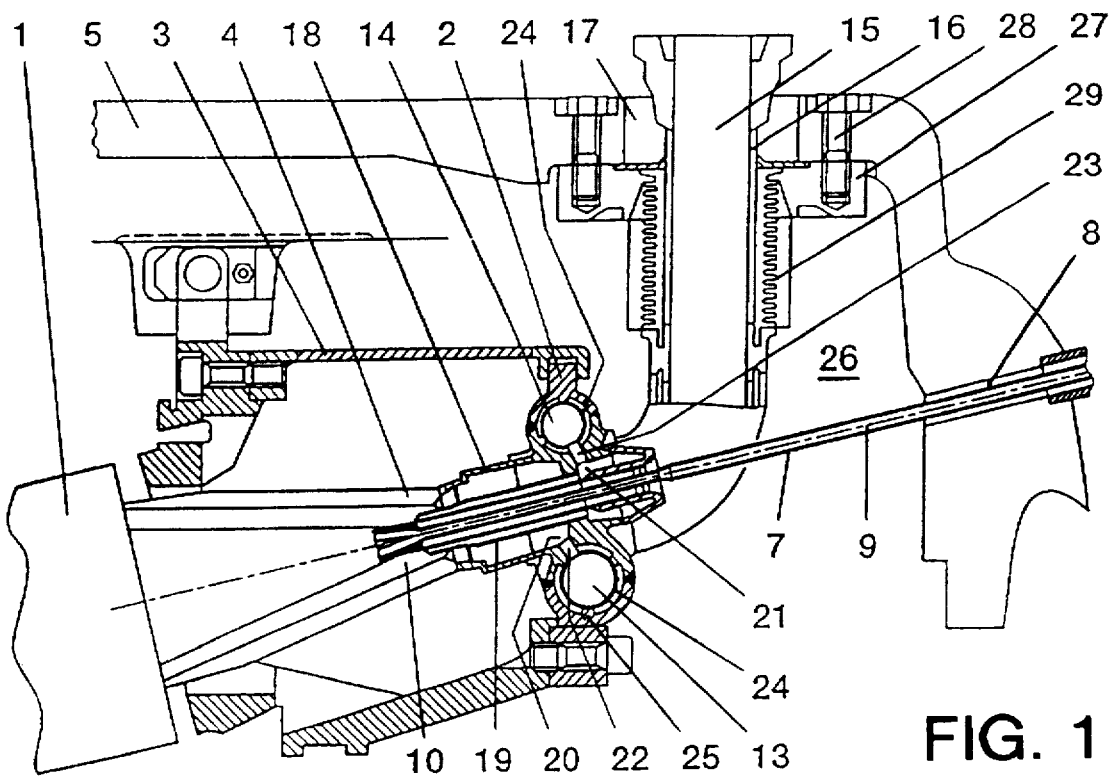
FIG. 1 shows a partial longitudinal section of the gas turbine, with gas-turbine casing, fuel lance and fuel feed according to the invention, in a first exemplary embodiment.
Figure 3:
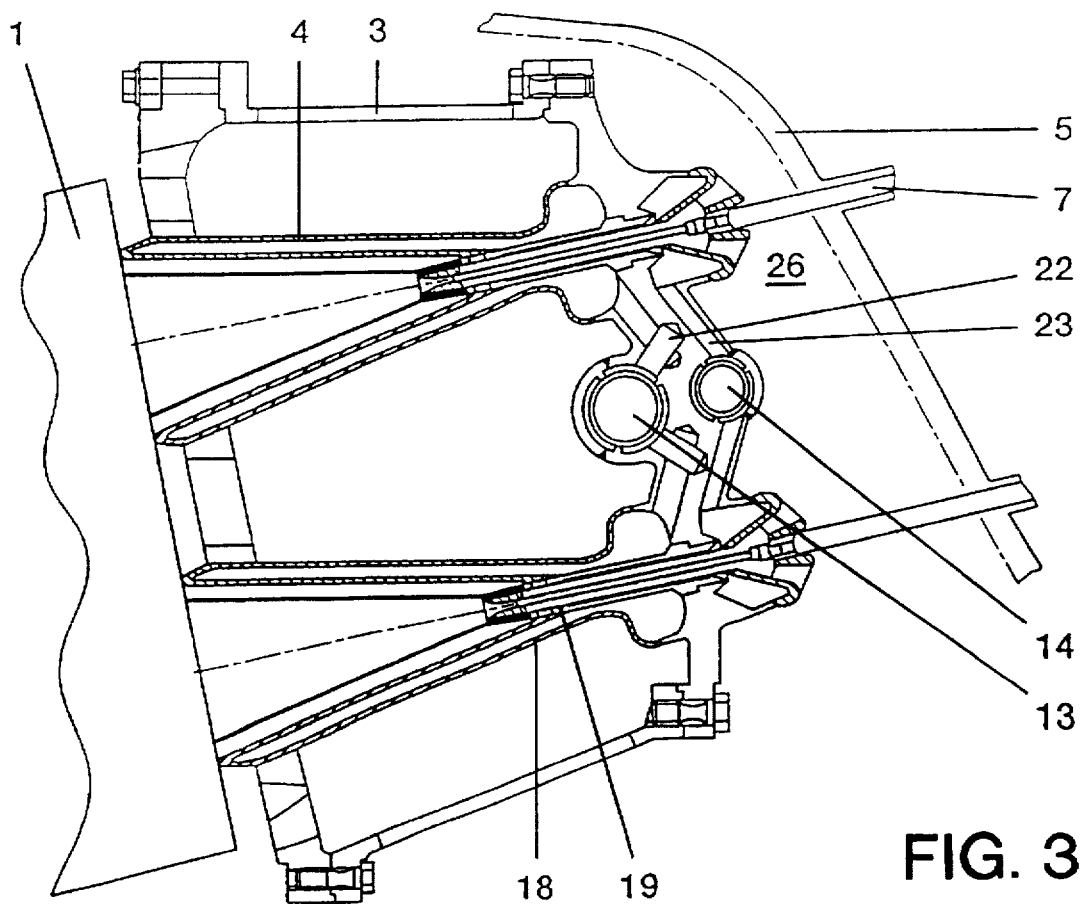
Figure 1A:
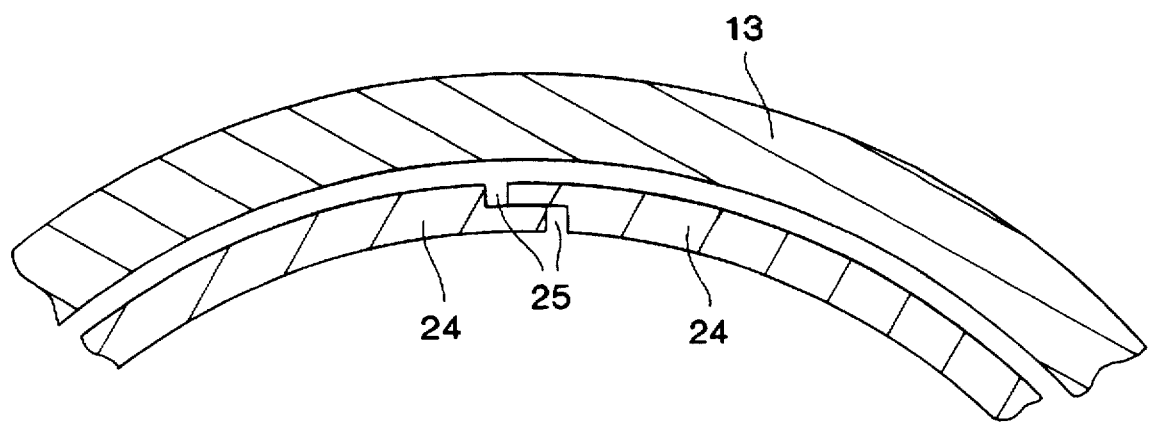
Figure 2:
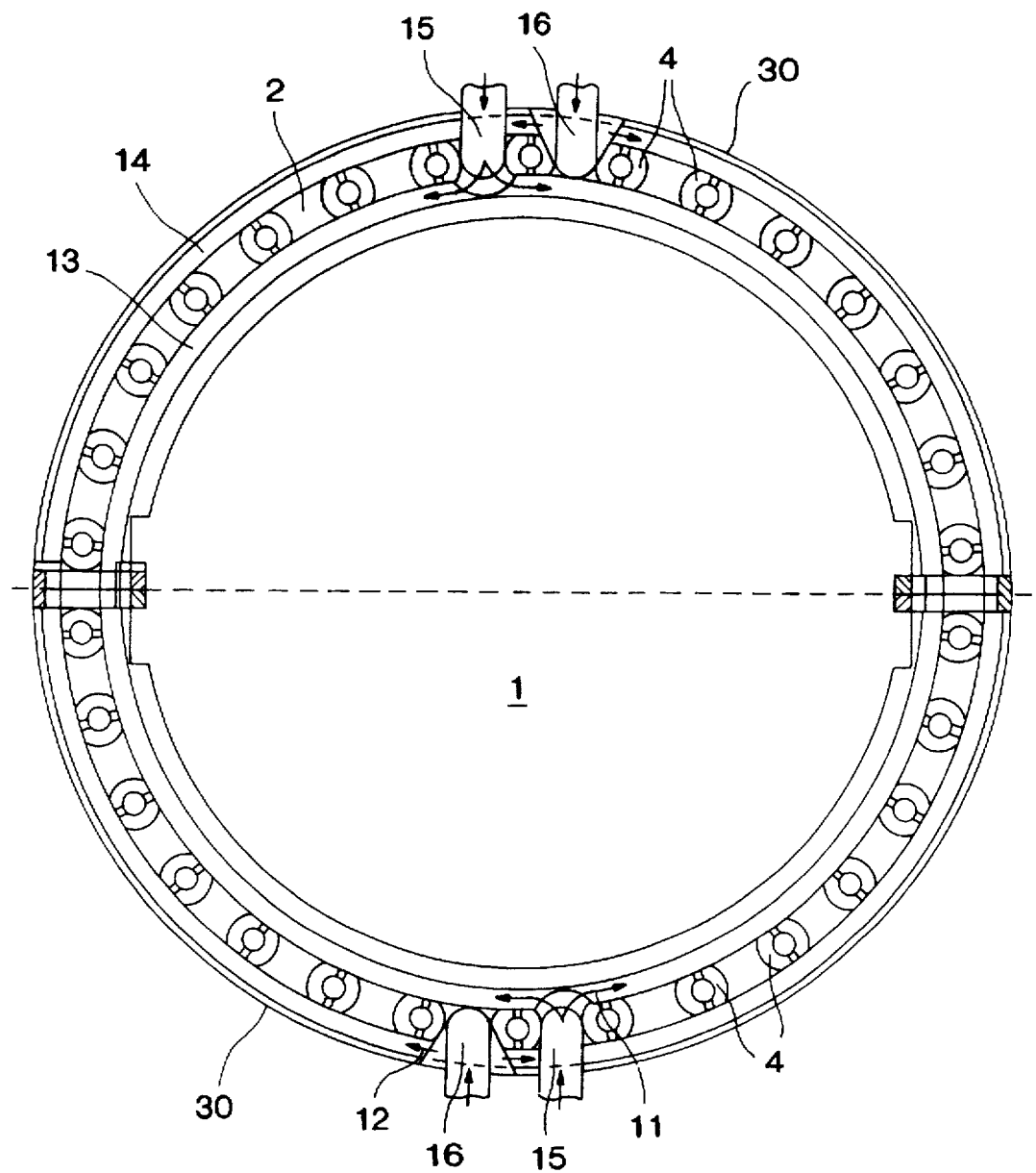
Figure 4:
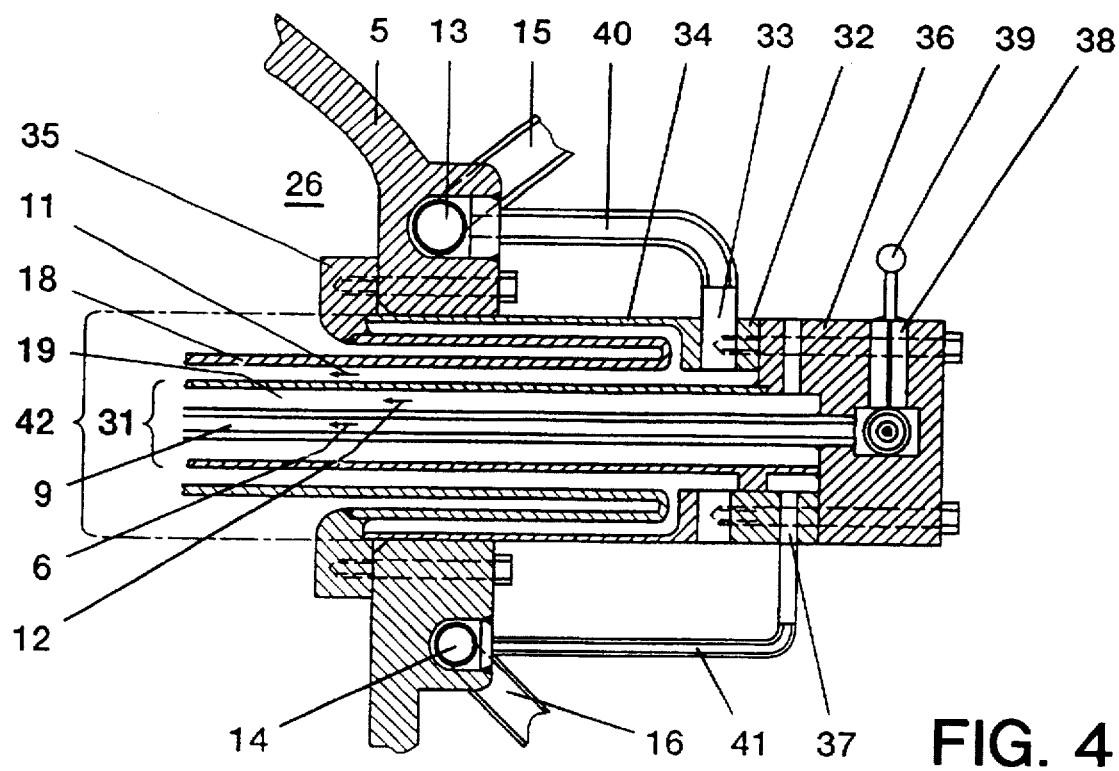
Figure 5:
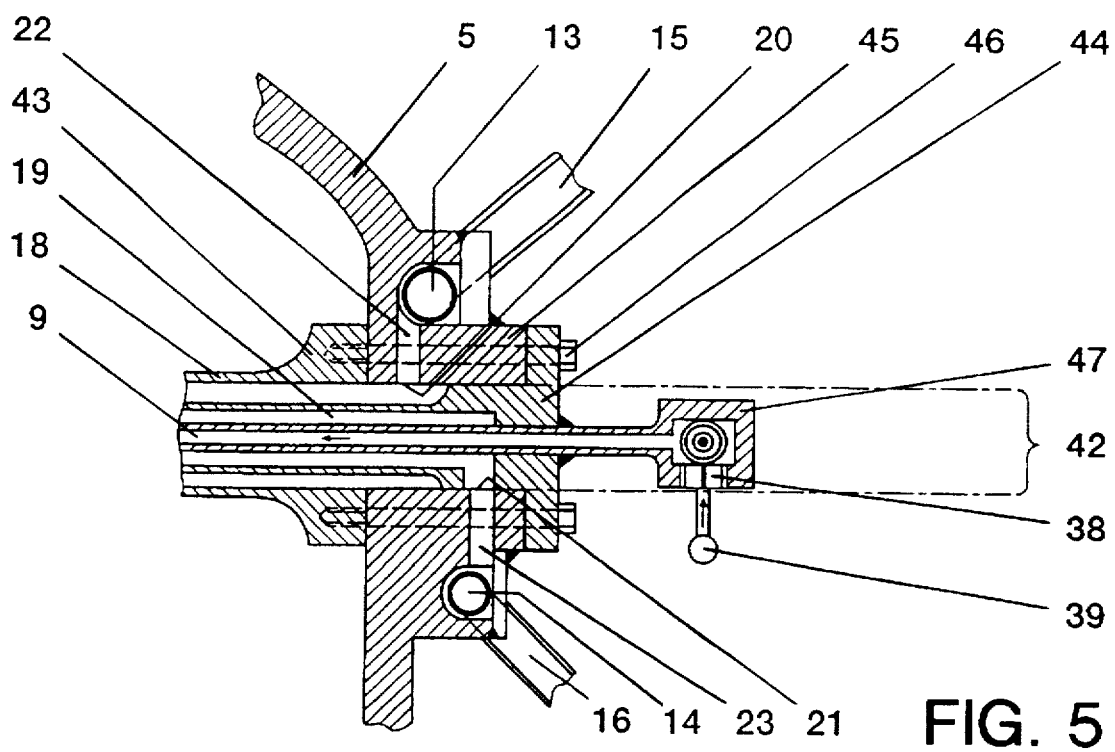

FIB. 1A shows a sectional view of an expansion joint for a fuel ring insert;

FIG. 2 shows a cross-section through a two-part annular combustion chamber, with the corresponding number of fuel feed lines;

FIG. 3 shows a representation in accordance with FIG. 1, but with a two-row burner arrangement;

FIG. 4 shows a partial longitudinal section in accordance with FIG. 1, but in another exemplary embodiment, two variants being shown;

FIG. 5 shows a partial longitudinal section of the gas turbine, with fuel lance and fuel feed according to the invention, in a further exemplary embodiment.

Only the elements essential for understanding the invention are shown. The direction of flow of the working media is designated by arrows.

DETAILED DESCRIPTION

Referring now to the drawings, wherein like reference numerals designate identical or corresponding parts throughout the several views, in FIG. 1 a gas turbine having an annular combustion chamber 1 and a plurality of burners 4 fastened in the rear wall 2 of an annular burner hood 3 is shown in a first exemplary embodiment. The burners 4 are designed as so-called double-cone burners in accordance with U.S. Pat. No. 4,932,861 to Keller et. al. They are supplied with fuel from outside the gas-turbine casing 5.

To feed liquid fuel 6, each double-cone burner 4 is connected to a fuel lance 7 which is arranged in each case in a mounting hole 8 in the gas-turbine casing 5. The fuel lances 7 consist of a single fuel feed line designed as a liquid-fuel passage 9 and are connected to a corresponding nozzle 10. They may therefore be of relatively small dimensions.

The fuel feed for gaseous fuel 11, 12, i.e. for main gas and pilot gas, consists in each case of a main-gas ring line 13 and a pilot-gas ring line 14 arranged in the interior of the rear wall 2 of the burner hood 3. The ring lines 13, 14 are connected upstream in each case to a central fuel feed line designed as main-gas feed line 15 and pilot-gas feed line 16 respectively, which in turn are fastened in mounting holes 17 in the gas-turbine casing 5. The ring lines 13, 14 are connected downstream to the annular combustion chamber 1.

To this end, each double-cone burner 4 is welded to a coaxial main-gas tube 18, which accommodates a pilot-gas line 19 and the fuel lance 7 in its interior. Both the main-gas tube 18 and the pilot-gas line 19 open out in the rear wall 2 of the burner hood 3. They are connected there to the main-gas ring line 13 and the pilot-gas ring line 14 respectively via a first and a second opening 20, 21 respectively as well as via in each case a distribution bore 22, 23 corresponding therewith and formed in the rear wall 2.

No fuel lances 7 are required for annular combustion chambers 1 operating solely on gaseous fuel 11, 12. In this case, the fuel feed for the entire annular combustion chamber 1 is effected merely via the central main-gas and the central pilot-gas feed lines 15, 16. Accordingly, only two mounting holes 17 are formed in the gas-turbine casing 5, which substantially increases its stability under load.

Insert tubes 24 having expansion joints 25 are arranged between the inner surface of the rear wall 2 and the main-gas ring line 13 and the pilot-gas ring line 14 respectively arranged therein. Starting from the rear wall 2 of the burner hood 3, the main-gas and the pilot-gas feed lines 15, 16 run through the so-called plenum 26, a space carrying compressed air inside the gas-turbine casing 5, and are fixed to the gas-turbine casing 5 with in each case a fastening element 27 designed as a flange. To this end, the flange 27 bears on the inside against the gas-turbine casing 5 and is held from the outside by means of two screws 28. An expansion element 29 designed as a bellows mounting and acting in the fastening and tension directions is arranged on the respective flange 27.

During operation of the gas turbine, the main gas 11 or pilot gas 12 directed via the main-gas and the pilot-gas feed lines 15, 16 into the ring lines 13, 14 is already distributed inside the pressure-carrying burner hood 3 to the main-gas tubes 18 and the pilot-gas lines 19 of the double-cone burners 4. In this way, the fuel feed is substantially simplified.

All connections between the ring lines 13, 14 and the double-cone burners 4 are welded. Thus potential leakages due to detachable screw connections are reduced, and the operational reliability of the gas turbine and its availability increase. In addition, quick dismantling is also ensured, since only a small number of connections are to be released.

The insert tubes 24 serve to thermally insulate the main gas 11 and the pilot gas 12 from the hot compressor air located in the plenum 26. Thus excessive heating of the at first relatively cool gaseous fuel 11, 12 is prevented and a uniform fuel supply to all double-cone burners 4 is guaranteed. Changes in diameter in the insert tubes 24 are compensated for via the expansion joints 25. The differential movements of the main-gas and the pilot-gas line 15, 16 are absorbed by the bellows mounting 29.

In the case of a horizontally split gas turbine, the annular combustion chamber 1 is also of two-part design (FIG. 2). One central main-gas feed line 15 and one central pilot-gas feed line 16 are arranged for each ring part 30. Therefore only one main-gas feed line 15 and one pilot-gas feed line 16 have to be released when the annular combustion chamber 1 is opened.

In a second exemplary embodiment, the double-cone burners 4 are arranged in two rows in the annular combustion chamber 1 (FIG. 3). In this solution, too, only one central main-gas feed line and one pilot-gas feed line (not shown here) as well as one main-gas ring line 13 and one pilot-gas ring line 14 are formed. The ring lines 13, 14 are arranged between the two rows of double-cone burners 4 and are connected to the main-gas tubes 18 and the pilot-gas lines 19 respectively of the corresponding double-cone burners 4 via in each case two distribution bores 22, 23 formed in the rear wall 2 of the burner hood 3.

The fuel feed for a gas turbine is thereby achieved in a simple and clearly arranged manner even in the case of a two-row arrangement of the double-cone burners 4.

In a next exemplary embodiment of the invention (FIG. 4), all double-cone burners 4 of an annular combustion chamber 1 are fastened to the gas-turbine casing 5. They are likewise supplied from outside the gas-turbine casing 5 with liquid fuel 6 or with gaseous fuel 11, 12. To this end, each double-cone burner 4 is welded to a coaxial main-gas tube 18. The main-gas tube 18 accommodates a fuel lance 31 having an inner pilot-gas line 19 and a liquid-fuel passage 9. Starting from the double-cone burner 4, the main-gas tube 18 runs through the plenum 26 and is extended beyond the gas-turbine casing 5. Outside the gas-turbine casing 5, the main-gas tube 18 merges into a first end piece 32 in which a first connection 33 for the main gas 11 is attached laterally. An outer tube 34 surrounding the main-gas tube 18 is welded to the first end piece 32, which outer tube 34 runs back to the gas-turbine casing 5. The outer tube 34 is screwed from outside the gas-turbine casing 5 to a flange 35 arranged on the inside, so that both the main-gas tube 18 and the first end piece 32 are firmly connected to the gas-turbine casing 5.

In addition, a second end piece 36 is screwed to the first end piece 32, on which second end piece 36 a second connection 37 for the pilot gas 12 and a third connection 38 for a further feed line 39 are arranged laterally (shown above the fuel lance 31 in FIG. 4).

In a second variant of this exemplary embodiment, the second connection 37, as shown in FIG. 4 below the fuel lance 31, is screwed to the first end piece 32. The second end piece 36 can thereby be removed when changing the liquid-fuel passage 9 without also having to release the second connection 37 for the pilot gas 12.

The feed for the gaseous fuel 11, 12 consists of the main-gas ring line 13 and the pilot-gas ring line 14 arranged in the interior of the gas-turbine casing 5. The ring lines 13, 14 are connected upstream to the central main-gas feed line 15 and the central pilot-gas feed line 16 respectively, which in turn are fastened to the gas-turbine casing 5. Downstream, the ring lines 13, 14 are connected to the annular combustion chamber 1. To this end, a connecting line 40, 41 is arranged in each case between the main-gas ring line 13 and the first connection 33 and between the pilot-gas ring line 14 and the second connection 37.

A number of recesses 42 corresponding to the number of double-cone burners 4 are formed in the gas-turbine casing 5, through which recesses 42 the main-gas tubes 18 lead and in which they are fastened by means of the flanges 35.

To operate the gas turbine, the main gas 11 is directed via the central main-gas feed line 15 into the main-gas ring line 13. From there, it is distributed via the connecting lines 40 to the main-gas tubes 18 connected to the double-cone burners 4 and is finally burnt in the annular combustion chamber 1. The pilot gas 12 used to improve the control range of the double-cone burners 4 passes via the central pilot-gas feed line 16 into the pilot-gas ring line 14. It is distributed to the fuel lances 31 via the connecting lines 41. If the gas turbine is to be operated with liquid fuel 6, this liquid fuel 6 is directed via the feed line 39, acting on the third connection 38, into the fuel lances 31 or the liquid-fuel passage 9. The main-gas and the pilot-gas feed lines 15, 16 are then closed.

In a further exemplary embodiment of the invention (FIG. 5), the main-gas tubes 18, including the pilot-gas lines 19, end in the mounting holes 42 in the gas-turbine casing 5. For this purpose, the main-gas tubes 18 of the double-cone burners 4 in each case end upstream in a flange 43, which in the assembled state fits directly inside the gas-turbine casing 5. The pilot-gas line 19 is closed off by a cap-like end piece 44, which at the same time closes the recess 42 in the gas-turbine casing 5 to the outside. Tapped bores 45 corresponding with one another and parallel to the axis are formed in the flanges 43, the end pieces 44 and the intervening areas of the gas-turbine casing 5. The main-gas tubes 18 and the pilot-gas lines 19 are detachably fastened to the gas-turbine casing 5 by means of screws 46 guided in the tapped bores 45.

A first and a second distribution bore 22, 23 are formed in the gas-turbine casing 5 for each double-cone burner 4, which first and second distribution bores 22, 23 connect the main-gas ring line 13 and the pilot-gas ring line 14 respectively to the main-gas tube 18 and the pilot-gas line 19 respectively. To this end, the latter each have an opening 20, 21 corresponding with the distribution bores 22, 23. The liquid-fuel passage 9 is extended beyond the cap-like end piece 44. It ends in a separate end piece 47 on which the feed line 39 acts via the connection 38.

In this exemplary embodiment, the feeding of main gas 11 and pilot gas 12 into the main-gas tube 18 and the pilot-gas line 19 respectively is advantageously effected inside the gas-turbine casing 5 so that no additional lines and connections are required for this. In addition, the recesses 42 in the gas-turbine casing 5 may be of smaller dimensions due to the direct feeding of the gaseous fuels 11, 12.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A fuel feed apparatus for gas turbines having an annular combustion chamber having burners which
   a) are operable with either gaseous or liquid fuel,
   b) receive fuel via fuel-feed lines extending from outside a gas-turbine casing through mounting holes in the casing,
   c) each burner having an annular main-gas tube integrally connected thereto and having a pilot-gas line and a liquid-fuel passage disposed in an interior of the main-gas tube, wherein
   d) only one central main-gas feed line and one central pilot-gas feed line are connected to the annular combustion chamber,
   e) a main-gas ring line and a pilot-gas ring line are formed in a rear wall of a burner hood, and
   f) the main-gas ring line and the pilot-gas ring line are connected upstream to the main-gas feed line and the pilot-gas feed line respectively and are connected downstream to the annular combustion chamber.

2. The fuel feed apparatus as claimed in claim 1, wherein
   a) both the main-gas feed line and the pilot-gas feed line are fastened to the rear wall to connect to the main-gas ring line and the pilot-gas ring line, respectively,
   c) the main-gas tube of each burner opens out in the rear wall to connect to the main-gas ring line, and
   d) the liquid fuel passage comprises a fuel lance arranged in the main-gas tube.

3. The fuel feed as claimed in claim 2, wherein two distribution bores are arranged in the rear wall of the burner hood for each burner, which distribution bores connect the main-gas ring line and the pilot-gas ring line respectively to the main-gas tube and the pilot-gas line, and wherein a first and a second opening respectively corresponding with the distribution bores are formed in the main-gas tube and in the pilot-gas line respectively.

4. The fuel feed as claimed in claim 2, wherein insert tubes having expansion joints are arranged as linings between an inner surface of the rear wall and each of the main-gas ring line and the pilot-gas ring line.

5. The fuel feed as claimed in claim 4, wherein the main-gas and the pilot-gas feed lines are each fastened with at least one fastening element in one of the mounting holes in the gas-turbine casing, and wherein at least one expansion element is arranged on each of the fastening elements.

6. The fuel feed as claimed in claim 5, wherein the at least one expansion element comprises a bellows mounting.

7. The fuel feed as claimed in claim 1, wherein the annular combustion chamber is of two-part design having two half parts each having a ring part connected to form the single main-gas ring line and the single pilot-gas ring line, and wherein a central main-gas feed line and a central pilot-gas feed line are connected to each ring part.

8. The fuel feed apparatus as claimed in claim 1, wherein the burners are arranged in two rows and are both connected to a single central main-gas feed line and a single pilot-gas feed line and to a single main-gas ring line and a single pilot-gas ring line, the main-gas ring line and pilot-gas ring line being arranged between the burner rows and being connected to the main-gas tubes and the pilot-gas lines respectively of each of the burners of both burner rows by two distribution bores formed in the rear wall of the burner hood.

* * * * *